US008650596B2

(12) United States Patent
Scott, III et al.

(10) Patent No.: US 8,650,596 B2
(45) Date of Patent: Feb. 11, 2014

(54) MULTI-AXIS TELEVISION NAVIGATION

(75) Inventors: Samuel Thomas Scott, III, Los Gatos, CA (US); David Hendler Sloo, Menlo Park, CA (US); Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1358 days.

(21) Appl. No.: 10/699,940

(22) Filed: Nov. 3, 2003

(65) Prior Publication Data
US 2005/0097606 A1 May 5, 2005

(51) Int. Cl.
G06F 3/00 (2006.01)

(52) U.S. Cl.
USPC .................................. 725/52; 725/40; 725/45

(58) Field of Classification Search
USPC .......................................................... 725/52
See application file for complete search history.

(56) References Cited

U.S. PATENT DOCUMENTS

| 4,890,321 | A | | 12/1989 | Seth-Smith et al. |
| 5,450,500 | A | * | 9/1995 | Brett .............................. 382/162 |
| 5,576,755 | A | | 11/1996 | Davis et al. |
| 5,666,645 | A | | 9/1997 | Thomas et al. |
| 6,002,394 | A | | 12/1999 | Schein et al. |
| 6,040,829 | A | | 3/2000 | Croy et al. |
| 6,184,877 | B1 | * | 2/2001 | Dodson et al. ................ 725/110 |
| 6,209,129 | B1 | | 3/2001 | Carr et al. |
| 6,401,242 | B1 | | 6/2002 | Eyer et al. |
| 6,442,755 | B1 | | 8/2002 | Lemmons et al. |
| 7,197,715 | B1 | | 3/2007 | Valeria |
| 7,213,256 | B1 | * | 5/2007 | Kikinis ........................... 725/53 |
| 7,536,705 | B1 | | 5/2009 | Boucher et al. |
| 7,627,881 | B1 | | 12/2009 | Gonno et al. |
| 7,712,113 | B2 | | 5/2010 | Yoon et al. |
| 2002/0038358 | A1 | | 3/2002 | Sweatt, III et al. |
| 2002/0049971 | A1 | | 4/2002 | Augenbraun et al. |
| 2002/0166120 | A1 | | 11/2002 | Boylan, III et al. |
| 2002/0170060 | A1 | | 11/2002 | Lyman |
| 2002/0199204 | A1 | | 12/2002 | Mory et al. |
| 2003/0028884 | A1 | | 2/2003 | Swart et al. |
| 2003/0070170 | A1 | * | 4/2003 | Lennon ........................... 725/51 |
| 2003/0165324 | A1 | * | 9/2003 | O'Connor et al. .............. 386/69 |

(Continued)

FOREIGN PATENT DOCUMENTS

| WO | WO96/13935 | 5/1996 |
| WO | WO9613935 A1 | 5/1996 |
| WO | WO03/007596 | 1/2003 |
| WO | WO03007596 A1 | 1/2003 |

OTHER PUBLICATIONS

"XML schema mappings for heterogeneous database access", Collins et al., Information and Software Technology 44, 2002, pp. 251-257.

(Continued)

Primary Examiner — Brian Pendleton
Assistant Examiner — Jean D Saint Cyr
(74) Attorney, Agent, or Firm — Lee & Hayes, PLLC

(57) ABSTRACT

An exemplary multi-axis television navigation system defines television navigation axes according to attributes of television programs. In one implementation, if a television program has an attribute defining an axis, then the exemplary system links a predefined database query associated with the axis to metadata for the television program. When launched, the predefined query returns a sequence of navigable television programs having the attribute that defines the axis.

34 Claims, 17 Drawing Sheets

(56) References Cited

U.S. PATENT DOCUMENTS

| | | | |
|---|---|---|---|
| 2003/0233241 A1 | 12/2003 | Marsh | |
| 2003/0236708 A1 | 12/2003 | Marsh | |
| 2004/0001106 A1 | 1/2004 | Deutscher et al. | |
| 2004/0117831 A1* | 6/2004 | Ellis et al. | 725/53 |
| 2004/0221310 A1* | 11/2004 | Herrington et al. | 725/46 |
| 2004/0221311 A1* | 11/2004 | Dow et al. | 725/52 |
| 2005/0188402 A1 | 8/2005 | de Andrade et al. | |
| 2005/0235319 A1* | 10/2005 | Carpenter et al. | 725/52 |
| 2006/0064716 A1 | 3/2006 | Sull et al. | |
| 2007/0033533 A1 | 2/2007 | Sull | |
| 2008/0115169 A1* | 5/2008 | Ellis et al. | 725/46 |
| 2010/0157156 A1* | 6/2010 | Yuen et al. | 348/567 |
| 2010/0319041 A1* | 12/2010 | Ellis | 725/94 |

OTHER PUBLICATIONS

"XML Schema Part 0: Primer", W3C Proposed Recommendation, Mar. 30, 2001, pp. 1-64.

"XML Schema Part 0: Primer", W3C Proposed Recommendation, Mar. 30, 2001, XP-002305611, 64 pgs.

Translated Chinese Office Action mailed Apr. 14, 2011 for Chinese Patent Application No. 200910139546.4, a counterpart foreign application of US Patent No. 7,913,279.

The European Office Action mailed Jan. 26, 2012 for European Patent Application No. 03029624.8, a counterpart foreign application of US patent No. 7,913,279, 8 pages.

The Indian Office Action mailed Nov. 9, 2011 for Indian Patent Application No. 10/MUM/2004, a counterpart foreign application of US patent No. 7,913,279, 2 pages.

* cited by examiner

| | | | | |
|---|---|---|---|---|
| Elijah Wood | Lord: Fellowship | Lord: The Two... | Ash Wednesday | Avalon |
| Natalie Wood | Brainstorm | The Affair | The Ghost and... | The Searchers |
| Rowan Woods | Farscape Season 1 | Farscape Season 2 | Farscape Season 3 | Farscape Outtakes |
| Ed T. Wood, Jr. | Bride of the Mo... | Glen or Glenda | Jailbait | Plan 9 From... |

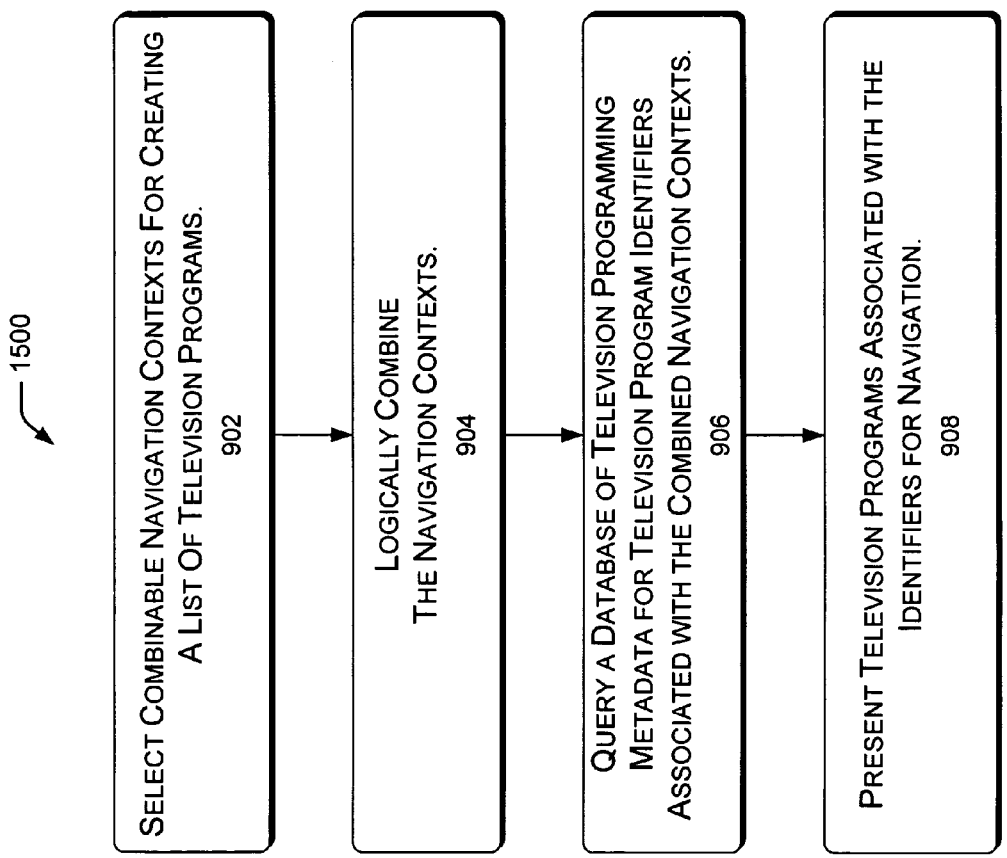

Sample Schema To Organize EPG Metadata To Support Multi-Axis TV Navigation — 1004

```xml
<?xml version="1.0" encoding="UTF-8"?>
<xs:schema xmlns:xs="http://www.w3.org/2001/XMLSchema" elementFormDefault="qualified">
    <xs:element name="actor">
        <xs:complexType>
            <xs:attribute name="name" type="xs:string" use="required"/>
        </xs:complexType>
    </xs:element>
    <xs:element name="axis">
        <xs:complexType>
            <xs:sequence>
                <xs:element ref="programs"/>
            </xs:sequence>
            <xs:attribute name="name" use="required">
                <xs:simpleType>
                    <xs:restriction base="xs:NMTOKEN">
                        <xs:enumeration value="actor_axis"/>
                        <xs:enumeration value="episode_axis"/>
                        <xs:enumeration value="director_axis"/>
                        <xs:enumeration value="rating_axis"/>
                        <xs:enumeration value="alphabetical_axis"/>
                        <xs:enumeration value="airing_date_axis"/>
                    </xs:restriction>
                </xs:simpleType>
            </xs:attribute>
        </xs:complexType>
    </xs:element>
    <xs:element name="id" type="xs:string"/>
    <xs:element name="program">
        <xs:complexType>
            <xs:sequence>
                <xs:element ref="actor" minOccurs="0" maxOccurs="unbounded"/>
            </xs:sequence>
            <xs:attribute name="id" type="xs:string" use="required"/>
            <xs:attribute name="title" type="xs:string" use="required"/>
            <xs:attribute name="description" type="xs:string" use="required"/>
            <xs:attribute name="rating" type="xs:string"/>
        </xs:complexType>
    </xs:element>
    <xs:element name="program_info">
        <xs:complexType>
            <xs:sequence>
                <xs:element ref="programs"/>
                <xs:element ref="axis" maxOccurs="unbounded"/>
            </xs:sequence>
        </xs:complexType>
    </xs:element>
    <xs:element name="programs">
        <xs:complexType>
            <xs:choice>
                <xs:element ref="program" maxOccurs="unbounded"/>
                <xs:element ref="id" maxOccurs="unbounded"/>
            </xs:choice>
        </xs:complexType>
    </xs:element>
</xs:schema>
```

Fig. 16

Sample XML Database for Multi-Axis TV Navigation

```xml
<?xml version="1.0" encoding="UTF-8"?>
<program_info
xmlns:xsi="http://www.w3.org/2001/XMLSchema-instance"
xsi:noNamespaceSchemaLocation="multiaxis.xsd">
    <programs>
        <program id="10000" title="Mountain View Live" description="Series Premeire" rating="4 stars">
            <actor name="John Smith"/>
            <actor name="Bill Jones"/>
        </program>
        <program id="10010" title="Mountain View Live" description="Series Finale">
            <actor name="John Smith"/>
        </program>
        <program id="20000" title="Extreme Underwater Basketweaving" description="Just when you thought it was safe..."/>
        <program id="30000" title="Off Buy One" description="The Programmers' Shopping Show">
            <actor name="Bill Jones"/>
        </program>
    </programs>
    <axis name="episode_axis">
        <programs>
            <id>10000</id>
            <id>10010</id>
        </programs>
    </axis>
    <axis name="actor_axis">
        <programs>
            <id>10000</id>
            <id>30000</id>
        </programs>
    </axis>
</program_info>
```

*Fig. 17*

MULTI-AXIS TELEVISION NAVIGATION

One .XSD text file listing and one .XML text file listing used in accordance with the subject matter are provided in FIGS. 16 and 17, respectively. The .XSD text file is an exemplary sample extensible markup language schema definition file for a metadata database and the .XML text file is an exemplary sample database suitable for multi-axis TV navigation.

TECHNICAL FIELD

The subject matter relates generally to multimedia data communications and specifically to multi-axis television information grid navigation.

BACKGROUND

Conventionally, television programming and its metadata guide information has been organized according to original broadcasting schedules into channels, characterized by a given program on a given channel at a given time. End users and broadcasters alike have become accustomed to the ingrained concept of navigating for programs in terms of a two-dimensional program listings grid, upon which for a given time point on a time axis of the grid each channel on a channel axis of the grid has a different program, reflected in language, such as "my favorite show will be on channel six at 8:00 pm." The time/channel information grid, however, is an arbitrary technique for defining a user's desire to find out what is on television.

A television channel represents a specific sequence of programs over time. Broadcasters conventionally determine the programming that they will carry during a future time interval, making the two axes of channel and time a natural and convenient way to organize television programming content and television programming metadata, that is, the guide information sometimes referred to as electronic program guide (EPG) data.

FIG. 1 shows metadata 100 for a program comprising multimedia content to be shown on television as a "TV show." Of many attributes included in the metadata 100, only two attributes, namely channel 106 and time 108, are utilized to place an identifier of the program, such as the title 102, into a conventional program listings grid (or guide) 104.

FIG. 2 shows the conventional program listings grid 104 of FIG. 1 in greater detail. The channel axis 202 is plotted against the time axis 204, as above, and provides the context for navigating among television programs.

At a given time point 206, usually selected to be the present moment, navigation conventionally consists of traversing from program to program along the channel axis 202. Most conventional TV systems have been designed to navigate according to a channel axis model, in which navigation of both programs and their respective program guide information typically follows the conventional channel axis 202 versus time axis 204 format. That is, as shown in FIG. 3, a navigation control, such as a "channel changer" located either on a TV set or on a remote control, traverses the channel axis 202 via, for example, "channel change keys 300," such as a "next" key 302 and a "previous" key 304. An "enter" or "select" key 306 often accompanies channel change keys 300. Some navigation controls that use channel change keys 300 also include left and right keys that may have a "first" and "last" function or perhaps a volume control function. The illustrated channel change keys 300 are presented, of course, only as one example of conventional navigation controls.

In traversing a channel axis 202, conventional navigation techniques generally hold the time axis 204 constant at a single point representing the present, and cycle through all available channels, displaying the program that is currently playing on each channel in turn, i.e., as a user changes channels the program currently playing on a particular channel automatically displays. The two attributes, channel and time, provide the context for conventional television programming navigation. Navigating from one program or program reference (program ID) to another is sometimes referred to as "scrolling" or "channel-surfing." Each program ID may be used to access stored data in a local, remote, or DVR media store.

Delivery of programs in a sequence over channels is the best-known context for organizing and navigating television content and characterizes a lingering and predominant mindset in the multimedia arts. However, there is now too much multimedia content to rely on conventional navigation techniques. It is awkward to navigate hundreds or even thousands of conventional channels.

Digital storage of television programs with its characteristic random access feature frees navigation systems from accessing only programs that are being broadcast in the present: program access is no longer limited to currently broadcasted content. Accordingly, the amount of content to choose from potentially consists of programs from thousands of channels (several hundred active channels in some present systems) multiplied by the content of each channel over a time period, which can be years. Although the system of navigating programs by a channel axis 202 and a time axis 204 persists, there is far too much multimedia content to be efficiently and enjoyably navigated by such a system. As Digital Video Recording (DVR) technology evolves, vast stores of content are becoming available to users as "everything on demand," making ease of navigation a priority.

SUMMARY

An exemplary multi-axis television navigation system defines television navigation axes according to attributes of television programs. In one implementation, if a television program has an attribute defining an axis, then the exemplary system links a predefined database query associated with the axis to metadata for the television program. When launched, the predefined query returns a sequence of navigable television programs having the attribute that defines the axis.

BRIEF DESCRIPTION OF THE DRAWINGS

FIG. 6 is a graphic representation of a multiple navigational axes combined in a two-dimensional grid.

FIG. 15 is a flow diagram of an exemplary method of multi-axis television navigation.

FIG. 16 illustrates an example schema to organize EPG metadata to support multi-axis TV navigation.

FIG. 17 illustrates an example XML database for multi-axis TV navigation.

DETAILED DESCRIPTION

Overview

The subject matter describes the use of database technology and digital storage to establish new axes, or logical sequences of programs for television exploration ("navigation") in addition to conventional axes known as broadcast channels. When television content is stored digitally, contexts for content discovery and navigation are not limited to conventional chronological sequences, indeed each program with its related attributes can stand on its own, and programs can be combined into navigable sequences based on other contexts besides chronological sequence. Conventional time/channel information grids generated by chronological sequences are an arbitrary technique for defining a user's desire to find out what is on television. The multiple combinable axes described herein allow the user to define custom navigational views that deliver the most useful information suited to the particular user, tailored to the user's taste.

The subject matter enables navigation on arbitrary axes without having to initiate explicit search commands. Predefined axes, such as "actor" and "episode" may be combined with Boolean operators to yield even more navigation contexts.

Figure 1:
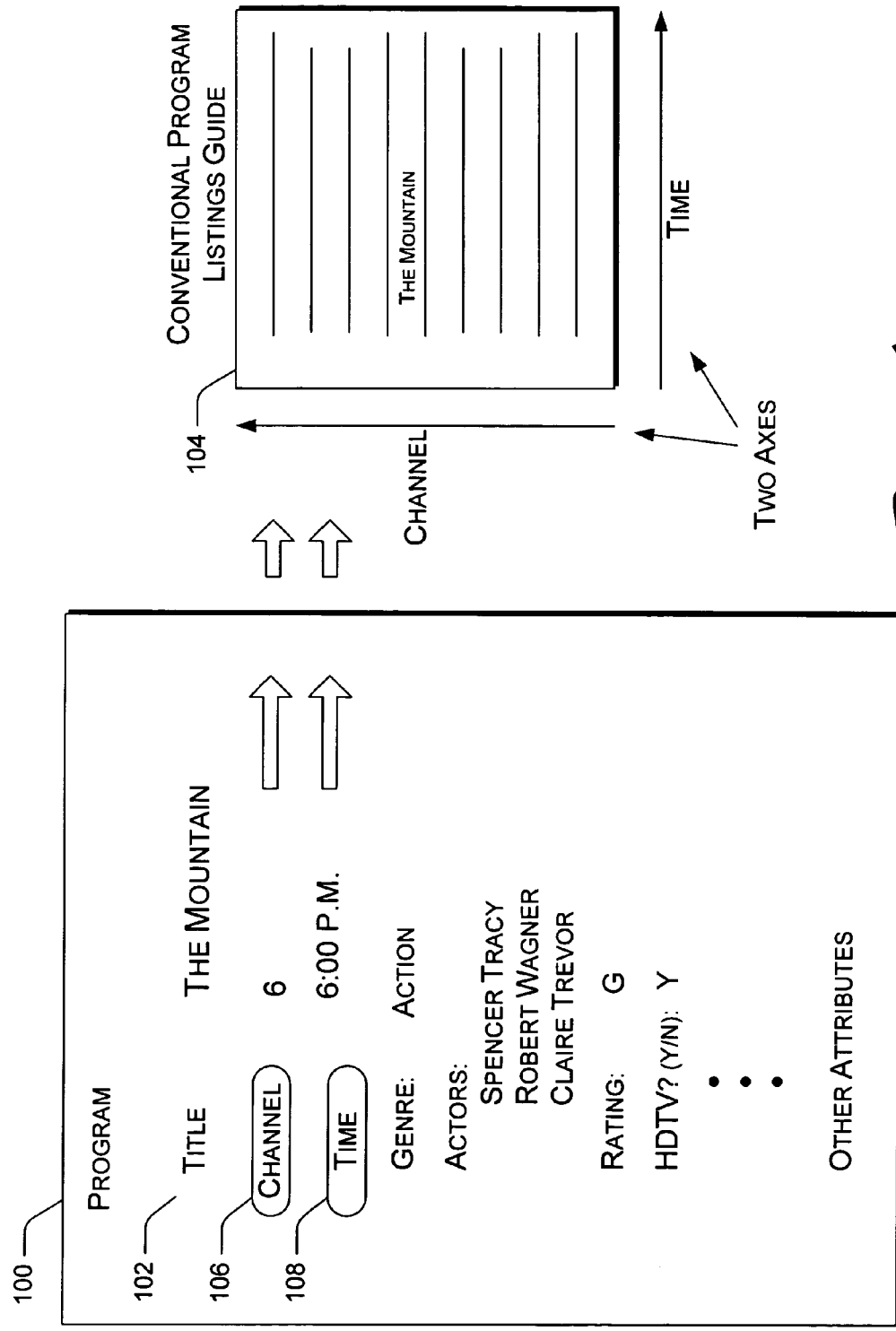
FIG. 1 is a graphic representation of a conventional television program guide information.
Figure 2:
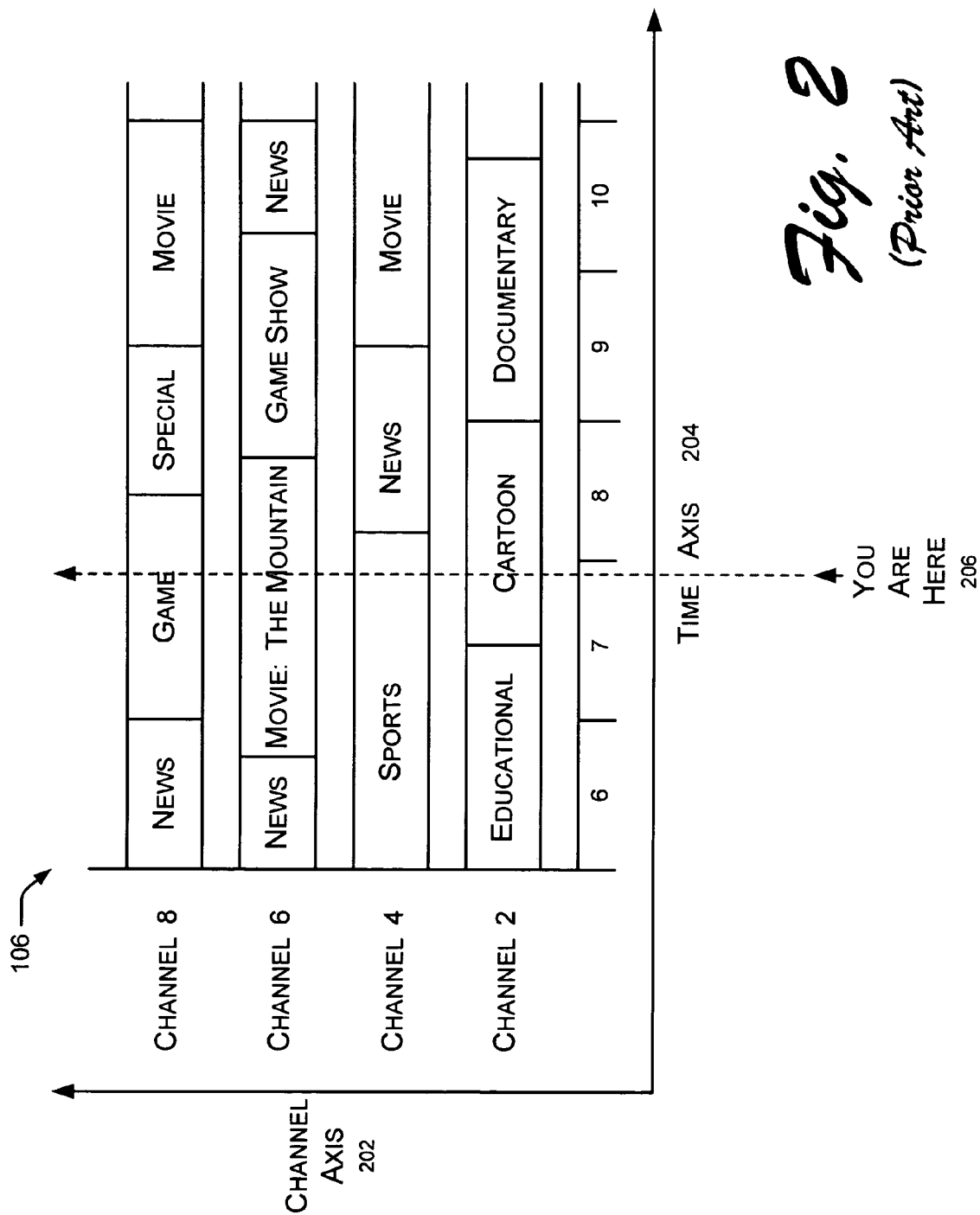
FIG. 2 is a graphic representation of a conventional program listings guide.
Figure 3:
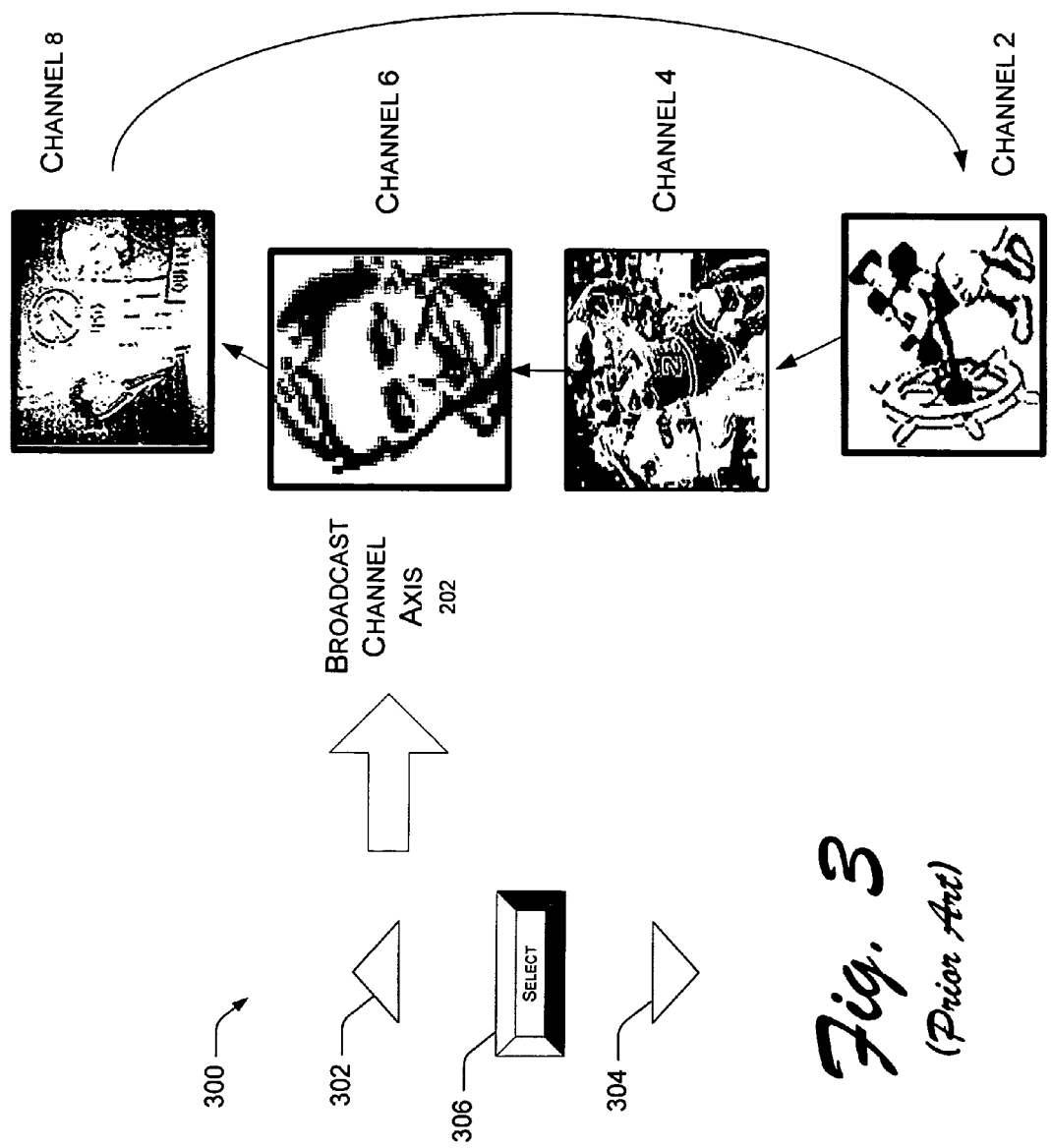
FIG. 3 is a graphic representation of conventional channel change navigation keys.
Figure 4:
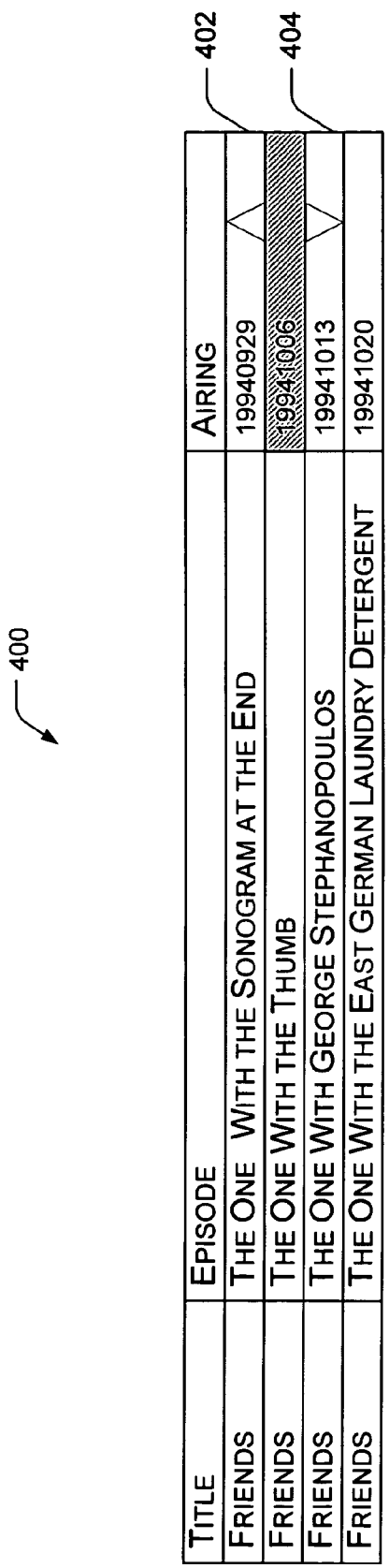
FIG. 4 is a graphic representation of an exemplary navigational axis based on an episode attribute.

A navigational axis ("axis") comprises a sequence of programs or more precisely, program identifiers (IDs) that are included in the sequence for some logical reason, usually a common attribute. Conventionally, a channel is one type of axis wherein programs are included in the axis sequence because they all proceed from a common broadcast point. Sequential ordering of programs within an axis may be left random or an ordered sequence may be imposed for an additional logical reason, for example, a conventional channel axis 202 has a particular temporal order that reflects the time that the included programs were broadcast. FIG. 4 shows an exemplary axis 400 configured by episode sequence, allowing a user to navigate among programs represented on the episode axis. In this example, the user watching the October 6th episode would be able to navigate to the September 29th episode (e.g., a "previous" key) or the October 13th episode (e.g., a "next" key).

Figure 5:
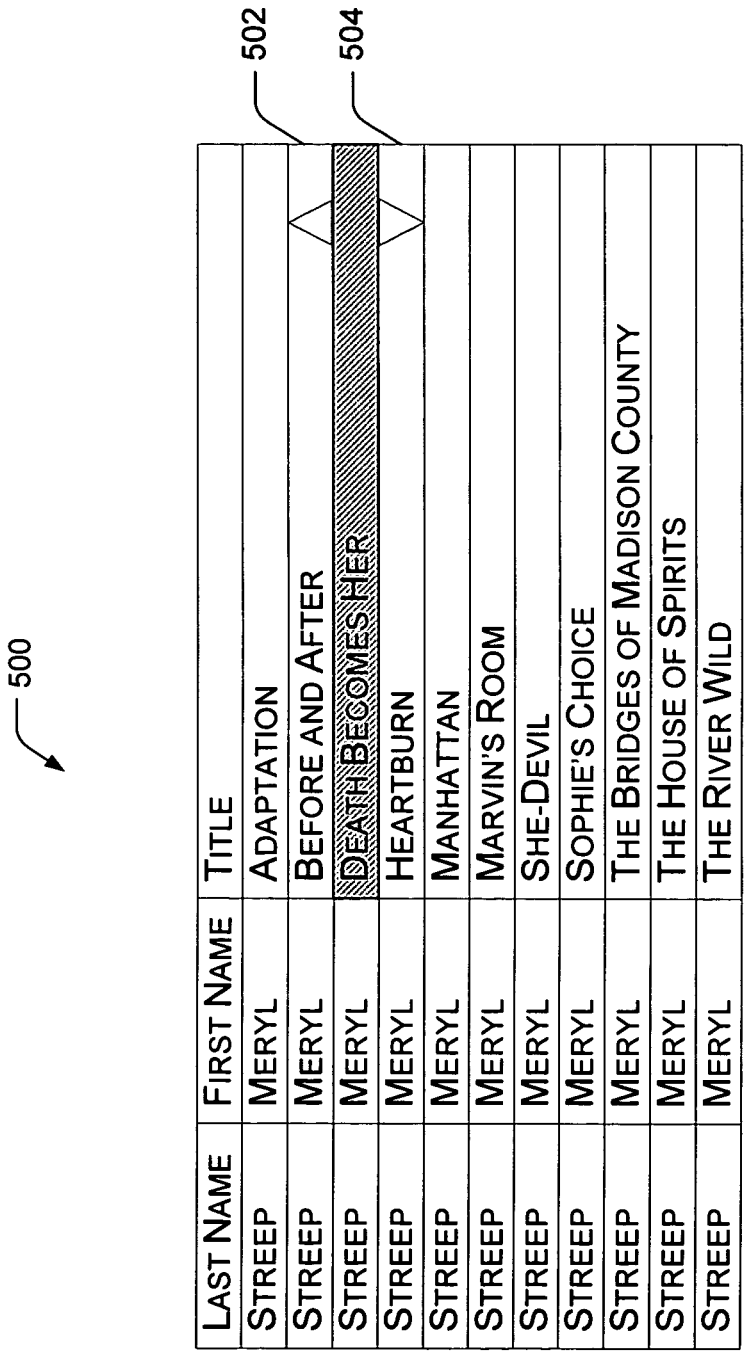
FIG. 5 is a graphic representation of an exemplary navigational axis based on an actress attribute.

"Navigation," as presented herein with respect to exemplary axes, refers to changing television channels to view different programs. Although with respect to exemplary systems and methods described herein "navigation" can also be applied to browsing just television programming information, i.e., EPG metadata, many implementations of the exemplary systems and methods describe navigating program content, not just program guide information. Hence, for example, when a user selects an exemplary "actor" axis specifying the actor Russell Crowe, navigation controls on the user's equipment change their function from cycling through programs based on broadcast channels to cycling between programs in which Russell Crowe plays a starring role. FIG. 5 shows another exemplary navigation axis 500 by actor name. In this example, a user can navigate to "Before and After" 502 (e.g., "previous" key) and "Heartburn" 504 (e.g., "next" key) with a single click.

Exemplary methods also allow logical combination of several exemplary axes to achieve even more refined or more extensive navigational contexts, for example, an episode axis specifying "M.A.S.H." and a year axis specifying "1978" result in a different episode of M.A.S.H. from 1978 playing on the user's equipment each time the user actuates "channel change" controls. FIG. 6 shows another type of exemplary axis combination, in which navigation of two discrete axes is enabled via a two-dimensional grid 600. In this example, analogous to the time/channel conventional program guide grid 104, a first column 602 represents an axis of different actors, while rows appended to the first column 602 each represent movies of one respective actor. A user can navigate by different actors and by movies of different actors based on the combination of axes.

In one implementation of exemplary navigation, when a user changes programs on an axis, e.g., presses a channel change key to interrupt one episode of GILLIGAN's ISLAND to view another episode of the same show, the interrupted episode resumes where it left off when the user returns. This allows a user to compare movies and episodes and to jump in and out of programs without missing any content.

Practically speaking, in most implementations, an exemplary navigational system might provide only four or five additional predefined axes (that can be further combined with each other) besides the well-known conventional channel and time axes, but many more axes than four or five are possible in an exemplary system since almost unlimited attributes can be used to describe a program.

When a user combines two or more navigational axes to yield a more refined navigational context, for example, axes combined to set up a navigational context of "FRIENDS" episodes AND "Elliot Gould" as actor AND "1997" as the relevant year, the user is relieved of the burden of finding a likeable program amidst large quantities of content. Rather than having to type in three search terms "FRIENDS," "Elliot Gould," and "1997" and supply the Boolean operator "AND" to launch a conventional database search of a content repository, instead links to predetermined queries that compute the axes are supplied in context: links to predefined navigational axes are embedded within overlays, content, and/or metadata being currently displayed in ways that are logically meaningful, i.e., "in context" as the user navigates. Hence, with a single selection or "click" a user can extend a context attribute from a present program, e.g., "actress Meryl Streep," into an axis having a navigational context of other Meryl Streep programs accessible one after another through the navigation controls that selected the Meryl Streep context attribute. Data associations for fulfilling the predetermined queries can be pre-rendered on a server or in a client. Pre-rendering on a client can offer its own processing advantages.

Exemplary axes are made available to a user as a link, icon, menu tree, etc., for example, in a UI that can be called up to show program metadata, including the links or icons to select axes. Alternatively, axes may be selected using cues, links, controls, etc., that are only on a remote control so that program metadata is never seen while a program associated with the metadata is playing on a display. For example, after pressing a "select" key 306 as a second function key, actuation of the right arrow key might always select an "actor" navigational axis.

In one implementation, axes that are likely to be selected in the context of a TV program that is currently playing are highlighted (e.g., by default) in program data or overlays accessible through the select key 306, etc., that allow axis switching. The user selects among axes and combinations of axes offered, but does not have to create new axes from scratch. In other words, as noted above, axis choices can be laid out for selection in the context of a show that is currently playing and selection of one or more axes launches predetermined queries.

For comparison, some features of the subject matter render exemplary program navigation on exemplary axes like surfing an Internet web, where hyperlinks are pre-placed in context in displayed content and new content revealed by clicking a hyperlink is pre-rendered. Thus, a user of an exemplary navigation system can move through content in a finely tuned logical manner using only a TV remote control or other navigation tool that has minimal navigation controls. The subject matter provides the added benefit that each time an exemplary axis and/or context is selected, navigation keys on the user's navigation tool, e.g., a TV remote controller, are converted to "changing channels" according to the newly selected axis and/or context until axes are changed again.

The subject matter takes advantage of the fact that often a user's current program or position within the program guide information provides a great deal of context and can act as a starting point or branching point for further navigation. Thus, if a user is currently focused on a science fiction movie, then an overlay for the science fiction movie providing opportunities to switch axes can include axis selections that represent logical "next steps" in navigation relative to the science fiction movie: for instance, more science fiction movies, more movies by the same director, more movies with the same actor, etc.

This detailed description describes subject matter that includes methods, engines, database structures, and query techniques for creating many types of navigational axes according to attributes of programs and their contexts in addition to conventional channel and broadcast-time attributes.

Multiple Navigational Axes

Figure 7:
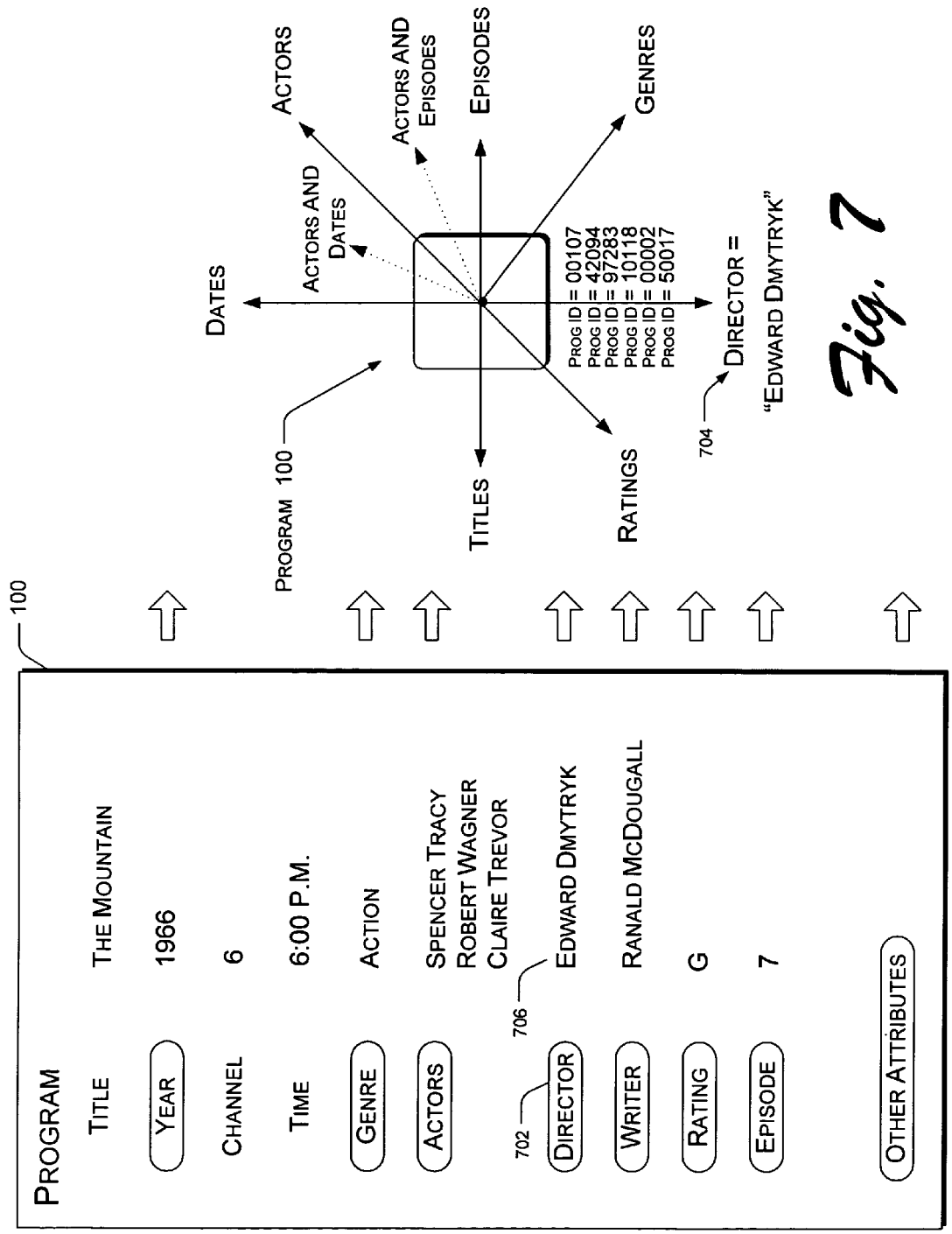
FIG. 7 is a graphic representation of various types of navigational axes based on program attributes.

FIG. 7 shows program metadata 100 for a movie, "The Mountain," available as a program on television. The metadata 100 includes many attributes and respective values for some of the attributes. Some attributes have an "either/or" or digital character (such as, "high definition TV" (HDTV) (y/n?)) while other attributes can assume a variable value within a known set of values, such as an actress name for an actress attribute, or the year 1978 within a range of years. Attributes may include the type of program (movie, TV series, etc.), program title, alphabetical order of title, year of release, channel, time, first air date, episode order, episode name, genre, actors, writer, director, producer, rating, sound characteristics, video characteristics, language, subtitles, closeness of match to search criteria, popularity, and many other attributes. Programs can have almost unlimited attributes, each of which can be used as a basis for configuring a navigational axis.

When a "director" attribute 702 is available as the context for a "director" navigational axis 704, an instance of the director axis 704 can be configured by also selecting the name "Edward Dmytryk" 706 as a value for the director attribute 702. A sequence of program IDs, if programs for such exist in an operative database, can be computed wherein each program ID points to a program that has the value. The director axis 704 can then be navigated by using navigational controls, such as channel change keys (e.g., 302, 304 and possibly 306), on a user's equipment, such as a TV set, television enabled computer, or TV remote control.

An exemplary application or multi-axis TV navigation engine (e.g., 904 below) changes the functioning of navigation controls (e.g., 300) substituting a new axis for the conventional channel axis 202 usually navigated by the navigation controls (e.g., 300). When a user presses one of the channel change keys 300, for instance, various events can occur depending on the implementation. In one implementation, a television navigation system is concerned mainly (or only) with the program guide information. In this case, navigating a "director" axis 704 results in the user browsing only the program guide information for each program ID associated with the selected director in the director axis 704.

In another implementation, an exemplary television navigation system displays actual programs for each program ID in an axis. Thus, pressing a channel change key (e.g., 302) changes between programs directed by the person named in the attribute value. If the attribute upon which an axis is based is "episode" then actuating a channel change key 302 would change between episodes of a subject program and display each different episode with each press of a channel change key 302.

Mechanisms for selecting axes to navigate and selecting values for the axes will be discussed more fully below with respect to FIGS. 13 and 14.

Figure 8:
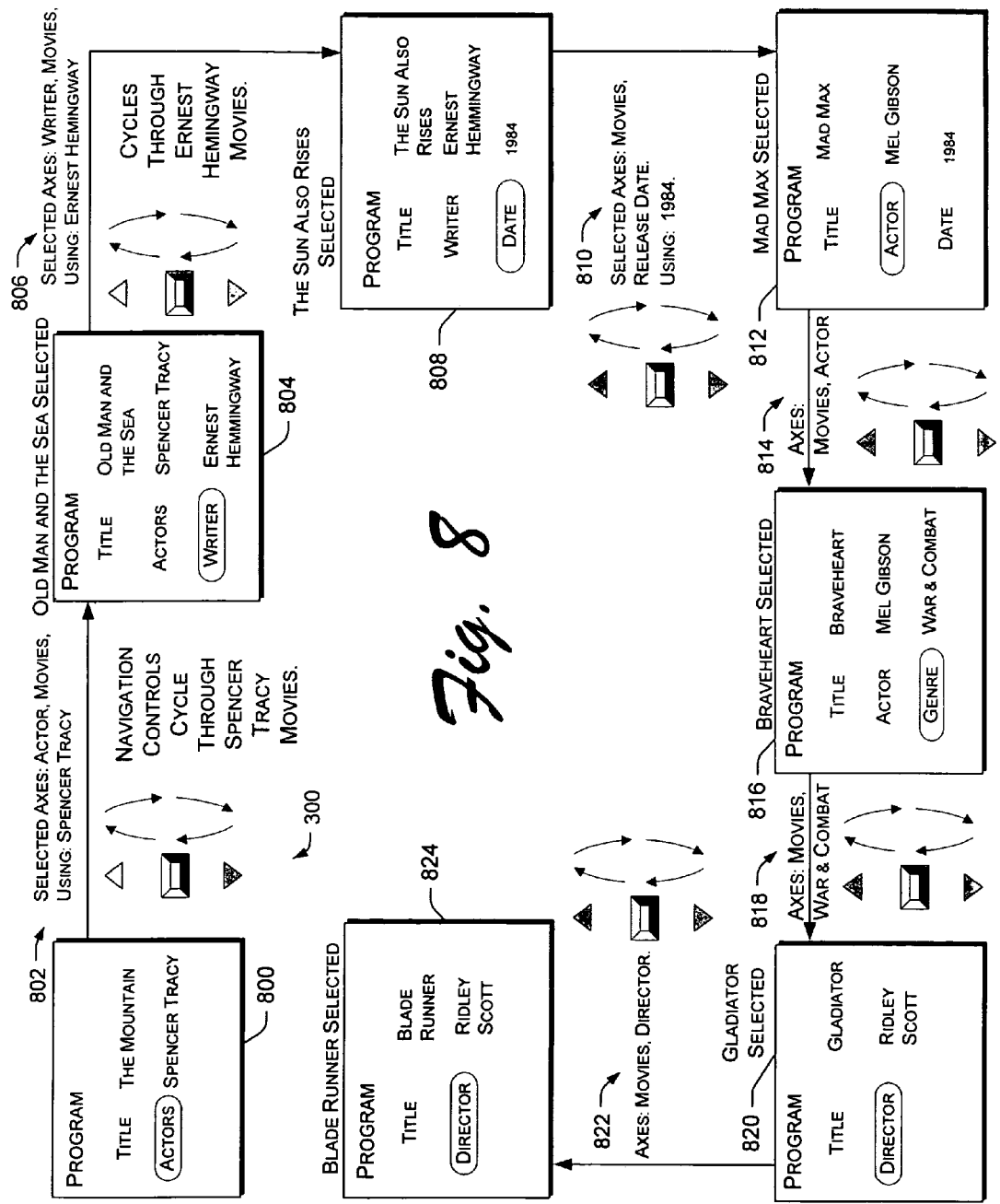
FIG. 8 is a graphic representation of multi-axis television navigation.

FIG. 8 shows various exemplary navigational axes being navigated in turn by the same navigation controls, such as a set of channel change keys 300. Of course, channel change keys 300 are only one example of navigational controls for multi-axis television navigation. Different operational controls could be used, such as a dial, a touch pad, a keyboard, a mouse, a wheel, trackball, displayed rolling cylinder, onscreen keys, onscreen grid, onscreen cascade of cards, order forms, voice activated navigator, etc. Channel change keys 300, however, demonstrate that exemplary multi-axis navigation can be accomplished via a minimum of controls, such as two or three buttons or keys.

In FIG. 8, a user is currently viewing a program 800, the "Mountain." In one implementation, the user has selected the program 800 by refraining from further channel changes, leaving the program 800 playing on a display. The user may then decide to change navigational axes.

A change of navigational axes may be implemented in various ways. In one implementation an actuation of a "select" key 306 calls up a menu overlaying the program and converts the "previous" and "next" keys 302, 304 to movement keys for navigating the menu until the select key 306 is actuated again, for example, to select a different axis. The menu may provide a list of axes to choose from. In another implementation, a press of a select key 306 allows other keys 302, 304 to cycle choices on a list of axes but a menu is not displayed on the same display as the program, however, the list of axes may be displayed on a remote controller bearing the navigation controls, such as channel change keys 300. In yet another implementation, when only program information (metadata 100) corresponding to a program ID is displayed instead of the program itself, then the metadata 100 may have embedded hyperlinks or icons that allow a user to select axes and/or values for the axes.

Regardless of which implementation of axis selection is employed, the user now changes navigational axes to an "actor" axis 802 that has a "Spencer Tracy" value for the actor attribute and a "movie" axis filter. Some attributes have only one possible value, such as the year of movie release, so that in one application a value for an axis choice defaults to a single value supplied by the metadata 100 without any user intervention. An exemplary application may also default to a first name on a list in the metadata 100, etc. Scrolling while the "Spencer Tracy as actor" axis 802 is selected results in a cycling through available Spencer Tracy movies, each of which are played in turn as the user scrolls. If the user stops on (selects) the movie "The Old Man and the Sea" 804, which starred Spencer Tracy, then "The Old Man and the Sea" 804 becomes a starting point if navigational axes are again switched.

The user switches to a "writer" axis 806. The writer of "The Old Man and the Sea" 804 was Ernest Hemingway, which is inserted as a value in a writer attribute upon which the writer axis 806 is at least in part configured. Now when the user scrolls, available movies based on books written by Ernest Hemingway are played in turn on the television display as the user scrolls with the channel change keys 300. The user pauses on the movie "The Sun Also Rises" 808, which becomes the next starting point for navigation.

The user switches to a "date" axis 810. A value of "1984" is supplied by default as the year of release of the movie "The Sun Also Rises" 808, which was the context or starting point from which axes were changed. As the user scrolls, movies released in 1984 are played in turn on the TV display. The uses stops on or otherwise selects the movie, "Mad Max" 812, which was released in 1984.

The navigational path through television programming content can continue indefinitely with any number of axis changes. A user might continue by reselecting an actor axis 814 and scrolling to arrive at the movie, "Braveheart" 816. From there, a genre axis 818 with the value "war & combat" could be selected and scrolling might arrive at the movie, "Gladiator" 820. Selection of a "director" axis 822 with a value of "Ridley Scott" from "Gladiator" 820 and scrolling might further arrive at the movie, "Blade Runner" 824, and so on.

Exemplary Multi-Axis TV Navigation System

Figure 9:
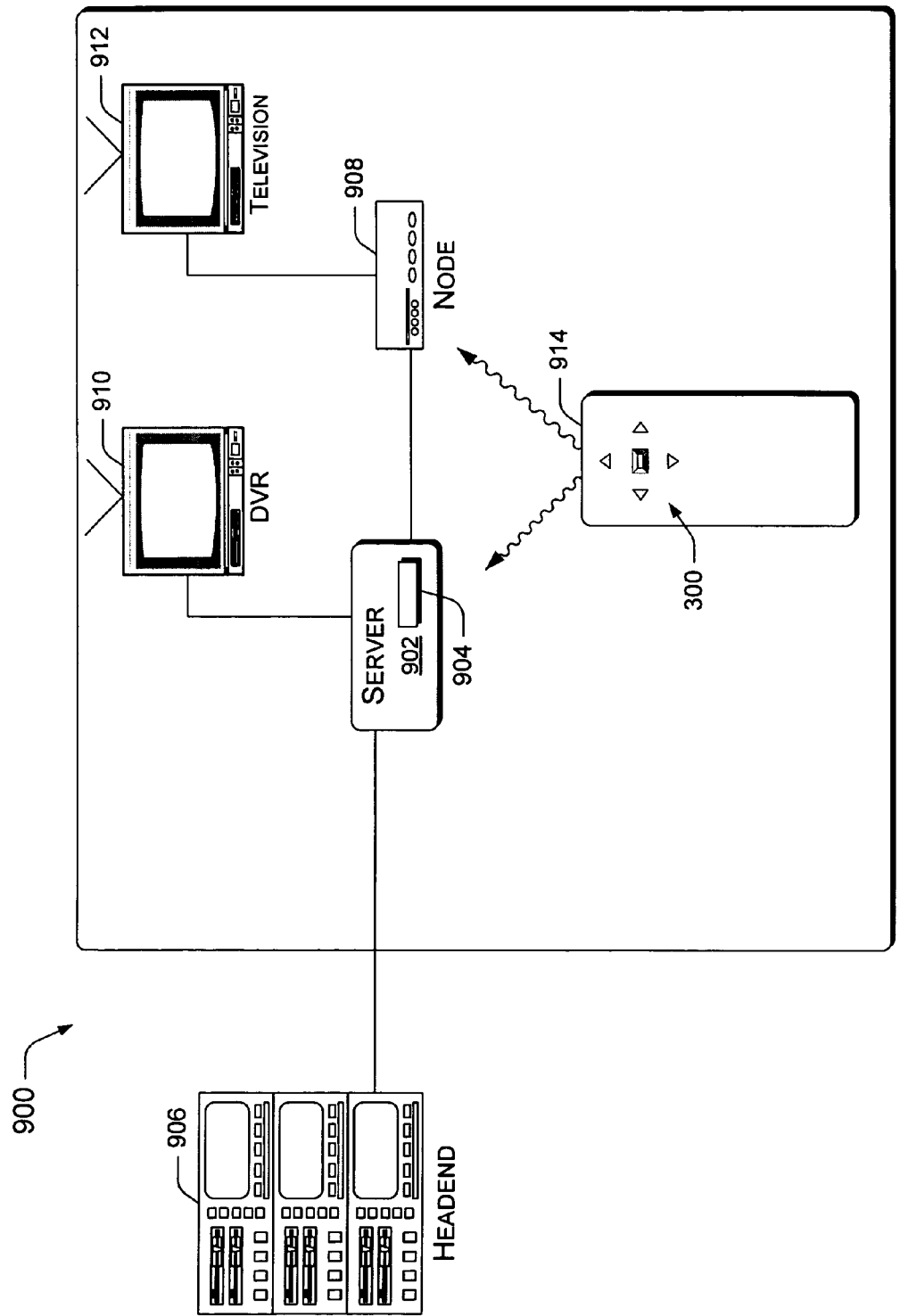
FIG. 9 is a block diagram of an exemplary multi-axis television navigation system.

FIG. 9 shows an exemplary multi-axis TV navigation system 900. The illustrated example is only one configuration of an environment suitable for practicing the subject matter, many other configurations are possible.

A server 902, which may serve as a hub for various connected multimedia devices, includes an exemplary multi-axis TV navigation engine ("navigation engine") 904. A headend 906, a node 908, such as a set-top box, a digital video recorder (DVR) 910, a television 912, and a remote controller 914 are also communicatively coupled as illustrated.

The remote controller 914 includes a navigation controller, such as "channel change keys" 300, which provide an agency for selection of program content, program metadata 100, and navigational axes via the multi-axis TV navigation engine 904. Although the navigation engine 904 is shown as included only in the server 902, in alternate implementations, various components of a navigation engine 904 could be located in different parts of the system 900. When the navigation engine 904 changes, computes, or creates an axis, the axis consists of a sequence of program IDs. Program content corresponding to each program ID may be accessed for play from the server 902, the headend 906, the DVR 910, etc. Additionally, if a particular system is set up to display program metadata 100 corresponding to program IDs on an axis, the program metadata 100 may also be accessed from a node 908 in which EPG data, for example, can be stored, or from the navigation engine 904 itself, if it includes a metadata cache.

Exemplary Multi-Axis TV Navigation Engine and Data Structure

Figure 10:
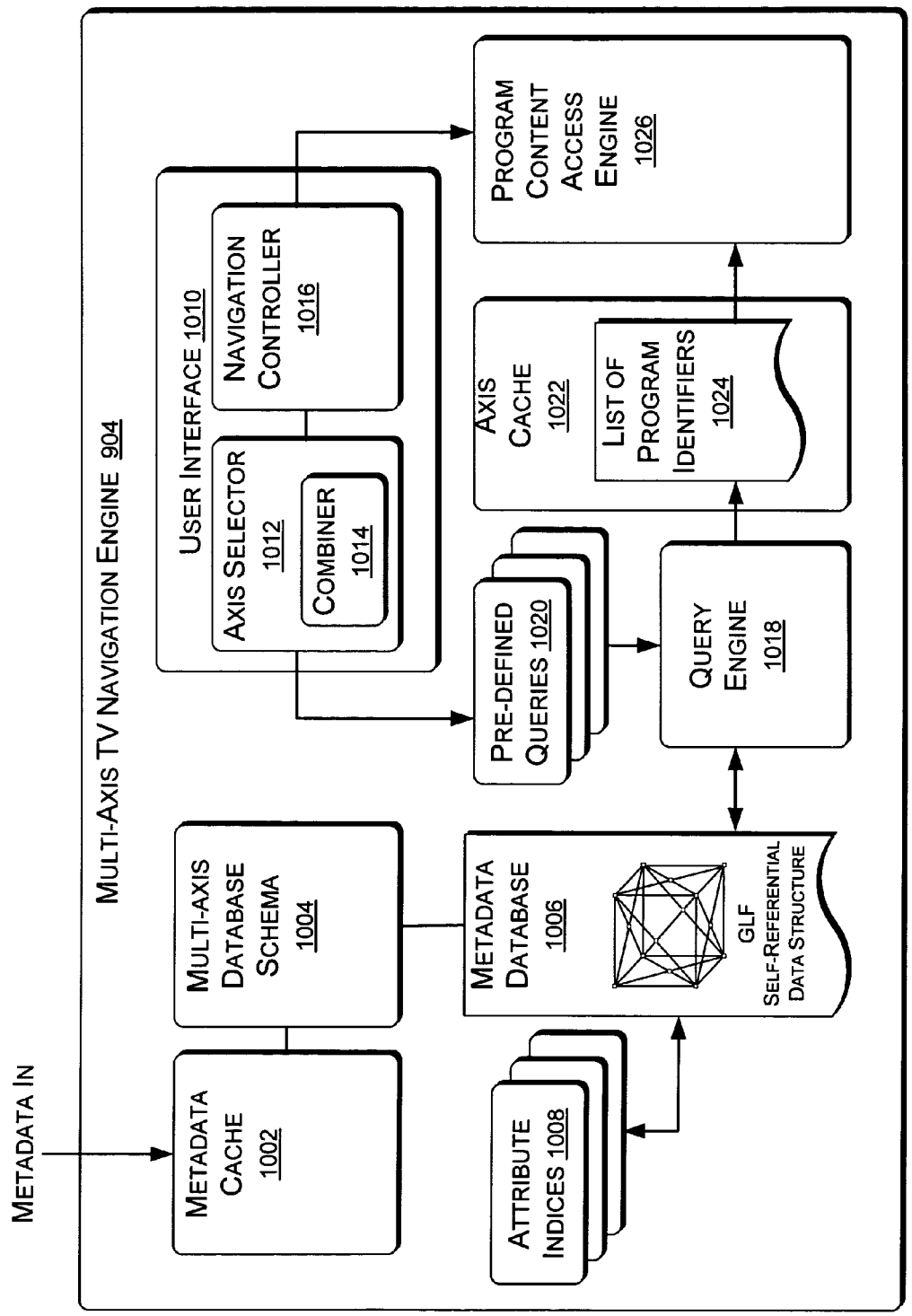
FIG. 10 is a block diagram of an exemplary multi-axis television navigation engine.

FIG. 10 shows an exemplary multi-axis TV navigation engine 904, in greater detail than FIG. 9. An exemplary navigation engine 904 may include a metadata cache 1002, a multi-axis database schema 1004, and a metadata database 1006, which may be broken out into multiple attribute indices 1008. A user interface (UI) 1010 may include an axis selector 1012 that includes a combiner 1014, and a navigation controller 1016, or in some implementations, a navigation controller interface (not shown). The user interface 1010 is coupled to communicate with a query engine 1018 via one or more predefined queries 1020. The query engine is coupled with an axis cache 1022 that includes one or more lists of program identifiers. The axis cache 1022 is communicatively coupled with a content access engine 1026. The illustrated engine can be implemented in hardware and/or software, and is merely one example of a navigation engine 904 suitable for practicing multi-axis TV navigation.

In operation, the metadata cache 1002 receives an input of EPG metadata 100 from a headend 906 of a content provider. The metadata 100 may be in various formats, depending on its source. The multi-axis database schema 1004 arranges, organizes, and/or parses the metadata 100 into a metadata database for compatibility with the query engine 1018 and the predefined queries 1020.

Since many different kinds of databases can be used for the metadata database 1006, the data structure adopted depends on the type. In relational or hierarchical database systems, the multi-axis database schema may index program attributes and/or certain values for the program attributes into index tables or child databases. In an extensible markup language (XML, etc.) system, a multi-axis database schema 1004, such as that represented by the extensible markup language schema definition (XSD) shown in FIG. 16, entitled: "Sample Schema To Organize EPG Metadata To Support Multi-Axis TV Navigation," specifies a self-referential data structure suitable for multi-axis TV navigation. An XML example of a self-referential metadata database 1006 is shown in FIG. 17, entitled "Sample XML Database for Multi-Axis TV Navigation." The sample metadata database shown in FIG. 17 includes four television programs and two axes, and demonstrates one manner of expressing the definition of an axis.

To recapitulate, a database schema 1004 defines the data representation model: the database schema 1004 organizes metadata 100 in a way that supports declarative queries to generate axes, that is, the sequences of programs or program IDs. From a data representation model, axes may be built, e.g., using indices and predefined queries, on a server 902 and made available for the UI 1010 as iterators. A user can set up a context, e.g., movies with Russell Crowe as an actor, and then iterate or navigate, e.g., "next," "previous," "first," "last," etc. ("first" can show a first episode in a series and "last" shows the last episode), over programs in the constructed axis.

An exemplary database schema 1004 captures program metadata 100 including, e.g., program title information and role information as it is received from a content provider and builds discrete or integrated indices and/or tables representing axes selected to be in the particular exemplary navigational system 900.

In one implementation, a database schema 1004 is in a global listings format (GLF), using a GLF relational model for television programming metadata 100 as described in U.S. patent application Ser. No. 10/356,694 to Andrew Simms and Samuel Thomas Scott, III, entitled: "Global Listings Format (GLF) for Multimedia Programming Content and Electronic Program Guide (EPG) Information." Television metadata 100 that is received in a GLF (format), which has self-referential structure and contains interlocking and cross-locking lineup, program, and scheduling data is already imbued with a great deal of relational character. GLF data is reliable, because during creation the interlocking and cross-locking fields are mandatory and may be screened for accuracy. In a GLF schema, moreover, relationships between related pieces of information are built into the fabric of the global listings format.

Whether or not a GLF is used for metadata 100 or the metadata database 1006, it should be noted that selection of a database schema 1004 may depend on the anticipated complexity of an exemplary navigation system 900. In one implementation, each service provider may have different axis index definitions, or in another implementation all axis index definitions are uniform for all participating content providers. For example, a premium service group has more complex content that may be assigned many attributes (e.g., users navigating over HOME BOX OFFICE, the SOPRANOS, R-rated movies, etc.) while a basic service group might be utilizing a different data center with lightweight content, wherein programs are assigned only a few attributes, such as release year and actors' names. Thus, when a subscriber upgrades from a lower service to a premium service more axes may be made available by the content provider.

In one implementation, one or more axis specifications process EPG metadata 100 into indices 1008 set up to assist predefined queries, which construct the axes. In this type of exemplary system, when a user selects an axis in the context of a default or selected attribute, for example an attribute selected from program currently being displayed, a predefined query associated with the selected axis runs through one or more appropriate indices 1008 to construct the selected axis, i.e., the list of program IDs. Depending on the format used for the EPG metadata 100, the formation of workable indices 1008 may require iterating and sorting out the newly revised EPG metadata 100 for each program, one program at a time. Program axis queries against a database 1006 then describe relationships between the indices 1008, and allow the database 1006 to produce the desired query response, thereby constructing a resulting axis. Thus, a query to the server 902 encapsulates commands to produce content on a new axis. Query composition can span one or more axes. A simple axis represents a single program attribute, whereas a complex axis represents more than one attribute. For example, a simple axis might represents "actor's name" specifying "Smith," while a complex axis might represent "actor's name" specifying "Smith" and "four star rating." Perhaps the user has just purchased a high definition TV and only wants to find HDTV programs amidst the content. If the navigation system 900 allows, the user can add a HDTV axis to specify only HDTV content.

In the exemplary UI 1010, the user may employ the navigation controller 1016 to call up an axis selector 1012, e.g., actuate a select key 306 to produce an onscreen overlay of program metadata 100 having embedded axis links. The navigation controller 1016 may then allow selection of one or more links. In one implementation, each axis selected has a predefined query 1020. Multiple axes may be joined by logical operators via the combiner 1014. For example, Boolean operators, such as AND, OR, XOR, NOT, etc. may be inserted between query terms to produce combination axes. Filtering logic may also be used to hone an axis to a very narrow set of program IDs.

The query engine 1018 may be a database engine created especially for the task of optimized metadata database 1006 queries, but in most implementations, standard database engines and tools, such as those included in MICROSOFT® SQL SERVER 2000 DATABASE SERVER work well in an exemplary navigation engine 904 (Microsoft Corp., Redmond, Wa). The query engine 1008 returns an axis, that is, one or more lists of program identifiers 1024, to an axis cache 1022. Then, a program content access engine 1026, as directed by the navigation controller 1016, reads a program ID from the list of program identifiers 1024 and retrieves a television program for display. The program content access engine 1016 may be set up to retrieve content from multiple sources, such as a remote headend 906 or storage media, local storage media on a server 902, a networked DVR 910, etc.

Figure 11:
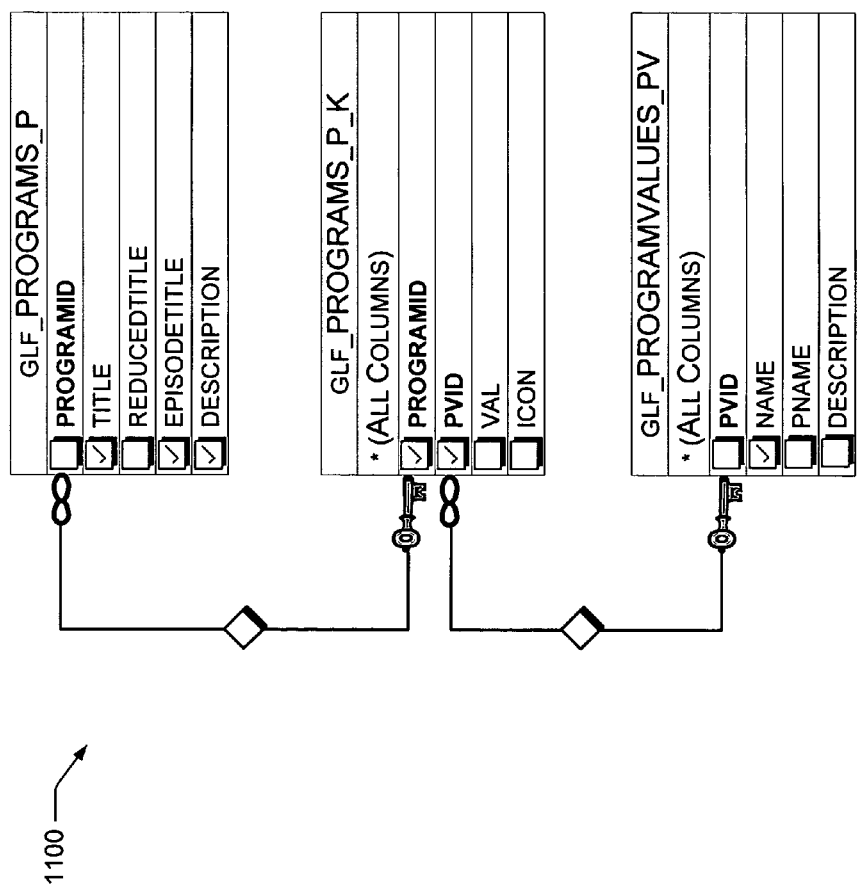
FIG. 11 is a block diagram of an exemplary predefined query structure.

FIG. 11 shows an exemplary query structure 1100, illustrating the key-value pair associations with program data. Using a relationship between the key-value pair associations with program data, the query establishes and produces an axis of program data for navigating by an episode attribute of program descriptions.

Figure 12:
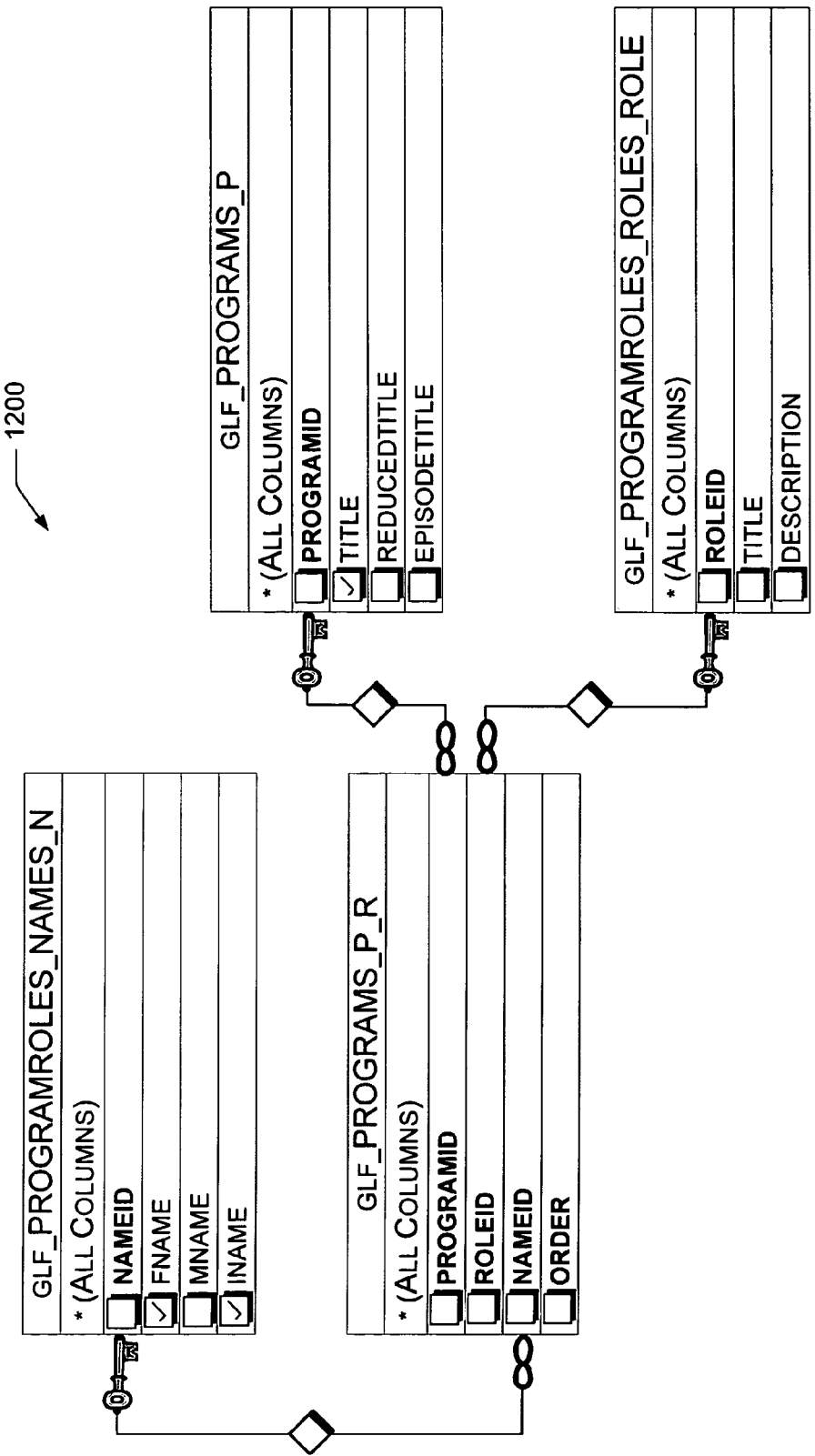
FIG. 12 is a block diagram of another exemplary predefined query structure.

FIG. 12 shows a query structure 1200, illustrating an actor-based axis construction. Using relationships between the key-value pair associations and the program data, the query establishes an axis of program data for navigating by the actor name attribute of program descriptions.

Exemplary User Interfaces

Exemplary UIs 1010 offer ways to select axes, that is, ways to select among data sets generated by the predefined queries 1020. The selection of multiple axes may be made available in the context of a UI 1010, as noted above, whether the UI 1010 is a grid, a program information page, icons, video thumbnails, etc. For example, in one exemplary UI 1010, clicking on a link or icon for one axis may display a hint, such as a highlight or dotted line outlining a cue word, that an alternate and/or additional axis is available to be iterated over. Or again, clicking on the word "page" on a displayed page of EPG metadata 100 might cause a cue word or icon for a movie axis to be highlighted. Perhaps another click highlights actors, building a combination of ever more refined navigation contexts using additional axes, with each click.

Figure 13:
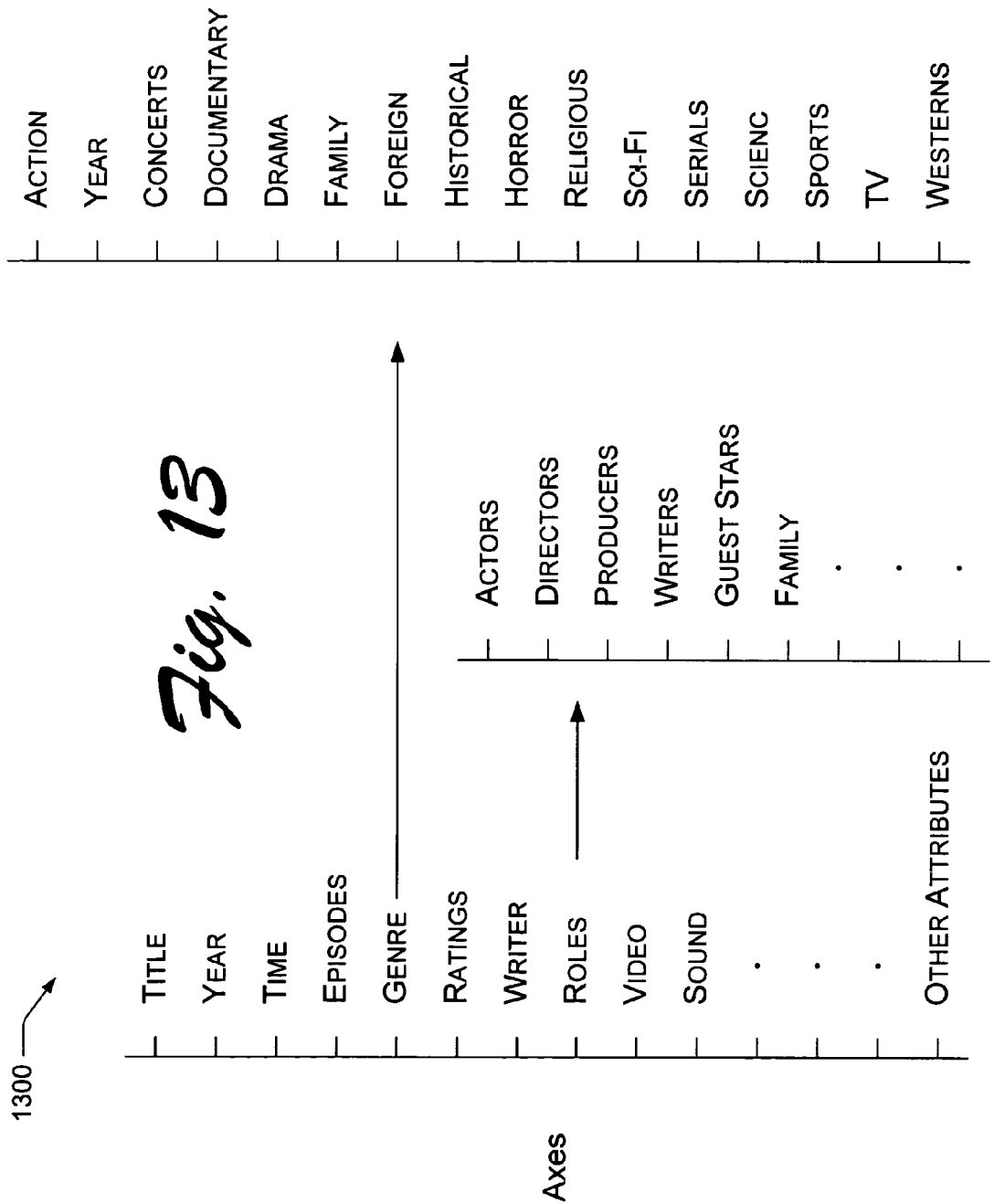
FIG. 13 is a graphic representation of an exemplary tree user interface for presenting axes for selection.

FIG. 13 shows part of an exemplary program attribute tree 1300 that can be used in various ways as an exemplary UI 1010 or as part of an exemplary UI 1010. In one implementation, the tree is displayed only on a remote controller 914 with navigation controls 1016 for highlighting and selecting attributes corresponding to axes. For many navigation systems 900, the exemplary tree 1300 only needs to include a few member attributes. In another implementation, the exemplary tree 1300 or parts thereof appears onscreen on the same display as the program content, for example, as a menu overlay. There are many types of UIs 1010, however, besides the exemplary tree 1300 that can be used for displaying axes for selection in an exemplary navigation system 900.

Figure 14:
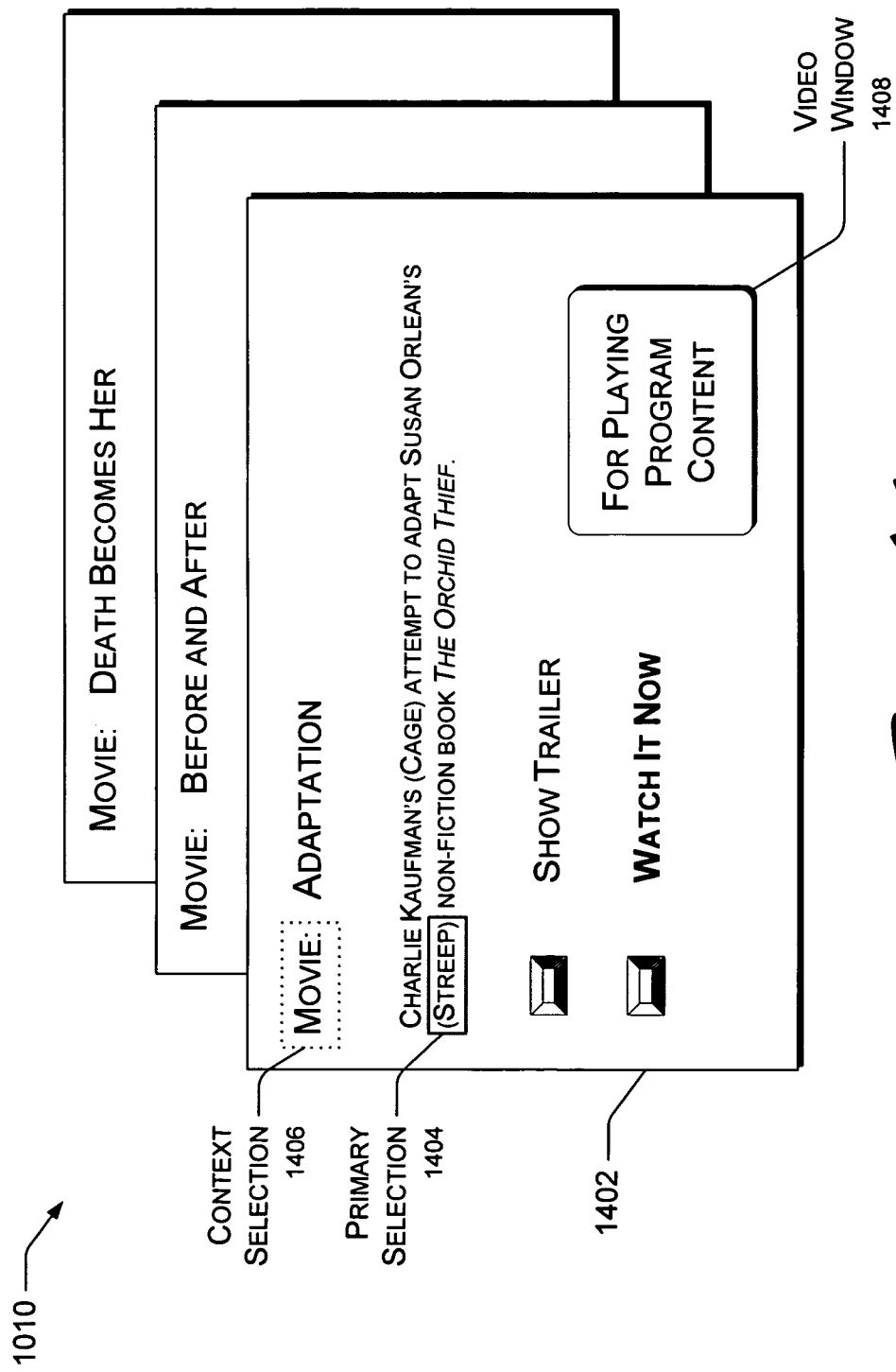
FIG. 14 is a graphic representation of an exemplary information page user interface for presenting axes for selection.

FIG. 14 shows an exemplary UI 1010 comprising an onscreen information page 1402 for each program ID on an axis. When a user navigates over the axis, which is associated with a name value for an actress, the respective information page 1402 for each current program ID comes to the front. The actress name (in the solid selection box) 1404 and movie attribute (in the dotted selection box) 1406 indicate that both attributes (name, movie) will be use in a Boolean "AND" fashion to determine navigation behavior. A video window 1408 may be added to each information page to play the television program and/or trailer associated with an information page when it is navigated to and comes to the front.

FIG. 15 is a flow diagram of an exemplary method 1500 of multi-axis TV navigation. This exemplary method 1500 can be performed by a module or engine, such as the exemplary navigation engine 904 shown in FIG. 10. In the flow diagram, the operations are summarized in individual blocks. The operations may be performed in hardware and/or as machine-readable instructions (software or firmware) that can be executed by a processor.

At block 1502, combinable navigation contexts for creating a list of television programs are selected.

At block 1504, the combinable navigation contexts are logically combined.

At block 1506, a database of television programming metadata is queried for television program identifiers associated with the combined navigation contexts.

At block 1508, television programs associated with the identifiers are presented for navigation.

FIG. 16 illustrates an example schema to organize EPG metadata to support multi-axis TV navigation. In an extensible markup language (XML, etc.) system, a multi-axis database schema 1004, such as that represented by the extensible markup language schema definition (XSD) shown in FIG. 16, entitled: "Sample Schema to Organize EPG Metadata to Support Multi-Axis TV Navigation," specifies a self-referential data structure suitable for multi-axis TV navigation.

FIG. 17 illustrates an example XML database for multi-axis TV navigation. An XML example of a self-referential metadata database 1006 is shown in FIG. 17, entitled "Sample XML Database for Multi-Axis TV Navigation." The sample metadata database 1006 shown in FIG. 17 includes four television programs and two axes, and demonstrates one manner of expressing the definition of an axis.

CONCLUSION

It should be noted that the subject matter described above can be implemented in hardware, in software, or in both hardware and software. In certain implementations, the exemplary system, engine, and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments' where tasks are performed over wireless communication by remote processing devices that are linked through a communications network. In a wireless network, program modules may be located in both local and remote communications device storage media including memory storage devices.

The foregoing discussion describes exemplary systems and methods for multi-axis television navigation. Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
   displaying a currently displayed television program on a display;
   activating a navigation system during display of the currently displayed television program, wherein the navigation system determines and displays a set of viewer-selectable attributes for the currently displayed television program overlaid on the currently displayed television program, the set of attributes comprising attributes which are each descriptive of a different aspect of the currently displayed television program, wherein each attribute of the set of viewer-selectable attributes corresponds to a combinable navigation context to generate a navigable sequence of television programs;
   selecting at least two attributes from the set of viewer-selectable attributes using one or more of three navigation keys comprising a previous key, a next key and a select key;
   logically combining the navigation contexts which correspond to the selected at least two attributes using Boolean operators;
   querying a database of television programming metadata for television program identifiers associated with the combined navigation contexts;
   generating a sequence of television programs associated with the identifiers for navigation, wherein the sequence comprises a corresponding navigational axis, the sequence of television programs including the current television program and at least one other television program that shares one or more of the selected attributes with the currently displayed television program; and
   navigating the sequence of television programs in the navigational axis, wherein the navigating comprises using the next key or previous key to change from displaying content of the currently displayed television program in the sequence to displaying content of another television program in the sequence, wherein the next key or previous key is used to cycle through the displaying of the content of the television programs in the sequence of television programs in the navigational axis without having to access a menu listing the television programs in the sequence to display the content of a next television program in the sequence.

2. The method as recited in claim 1, wherein the querying is performed by one or more predefined queries and each predefined query is associated with a combinable navigation context.

3. The method as recited in claim 1, wherein the set of attributes includes an actor attribute and a director attribute, and wherein logically combining the navigation contexts which correspond to the selected attributes comprises logically combining navigation contexts which correspond to the actor attribute and the director attribute to generate a single actor-director navigational axis.

4. The method as recited in claim 2, wherein links for launching the one or more predefined queries are associated with television program content.

5. The method as recited in claim 4, wherein the television program content is included in a conventional broadcast television show.

6. The method as recited in claim 4, wherein the television program content is included in one of an on-demand television show or an on-demand television movie.

7. The method as recited in claim 4, wherein the television program content is included in television musical programming.

8. The method as recited in claim 4, wherein a link is selectable while the television program content is playing.

9. The method as recited in claim 2, wherein links for launching the one or more predefined queries are associated with television program metadata.

10. The method as recited in claim 9, wherein a link is selectable while the television program metadata is displayed.

11. The method as recited in claim 1, wherein the select key of the navigation controls selects one or more of the combinable navigation contexts.

12. The method as recited in claim 11, further comprising using at least one of the combinable navigation contexts as a logical filter.

13. The method as recited in claim 1, wherein the Boolean operators are applied automatically based on an association between a link for launching a predefined query corresponding to a navigation context and the television program content associated with the link.

14. The method as recited in claim 1, wherein the Boolean operators are applied automatically based on an association between a link for launching a predefined query corresponding to a navigation context and the television program metadata associated with the link.

15. A method, comprising:
displaying content of a currently displayed first television program on a display;
activating a navigation system during display of the content of the currently displayed first television program, wherein the navigation system displays a set of viewer-selectable attributes that are descriptive of the currently displayed first television program;
receiving a selection of one or more attribute values from the displayed set of viewer-selectable attributes to define a query for television programming metadata;
identifying a plurality of television program identifiers corresponding to a plurality of television programs corresponding to the selected one or more attribute values; and
receiving input from the navigation control to sequentially display content of the plurality of television programs as a navigational axis corresponding to the one or more attribute values, the navigation control navigating the navigational axis by a single key used to cycle through displaying the content of the plurality of television programs identified without displaying a list of the plurality of television programs.

16. The method as recited in claim 15, wherein the navigation control comprises a next key, a previous key and a select key, wherein the next key or previous key is used to cycle through the content of the plurality of television programs identified without accessing the menu listing the plurality of television programs for navigating to the content of a next television program of the plurality of television programs.

17. The method as recited in claim 15, further comprising displaying program information for each television program in response to the navigation control accessing the television program.

18. The method as recited in claim 15, further comprising:
pausing a particular television program at a pause point in response to the navigation control accessing another particular television program of the plurality of television programs; and
resuming the particular television program at the pause point in response to the navigation control accessing the particular television program again.

19. The method as recited in claim 15, further comprising selecting multiple attribute values, wherein the multiple attribute values are combined in the query using Boolean logic operators, wherein the Boolean logic operators are applied automatically.

20. The method as recited in claim 19, wherein the Boolean operators are designated by a context of the currently displayed first television program.

21. A multi-axis television navigation system comprising:
a server for storing and accessing digital television programming content, the server configured to receive a query for a database of television program metadata based on one or more television program attributes selected by a viewer in relation to a currently displayed television program and return a particular navigation axis comprising a list of program identifiers of television programs corresponding to the one or more television program attributes selected, wherein
the navigation axis is navigable from display of content the currently displayed television program to display of content of a plurality of different television programs corresponding to the television program identifiers in the list in response to activation of a single key for cycling through the display of the content of the plurality of different television programs along the particular navigational axis identified by the list.

22. The multi-axis television navigation system as recited in claim 21, wherein the navigation axis is navigable using a next key, a previous key and a select key, wherein the next key or previous key is used to cycle through the display of the plurality of different television programs corresponding to the list without having to access a menu listing the plurality of different television programs in the list for navigating to a next television program in the list.

23. The multi-axis television navigation system as recited in claim 21, further comprising a data structure implemented by the server for arranging the program metadata in a relational schema, wherein the relational schema adheres at least in part to a global listings format.

24. A television navigation system comprising:
a computing device;
a storage medium including a database for television program metadata;
a query engine, executed by the computing device, to find one or more program identifiers in the database corresponding to one or more predefined queries, wherein a predefined query returns a navigational axis from the database, wherein a navigational axis is a list of program identifiers of television programs;
a user interface, executed by the computing device, to associate launch of the one or more predefined queries with selection of one or more attributes descriptive of a currently displayed television program, wherein activation of the user interface during display of a currently displayed television program results in the user interface presenting a set of viewer-selectable attributes that are descriptive of different aspects of the currently displayed television program; and
a navigation controller to navigate the navigational axis that is the list of program identifiers of television programs determined to correspond to the one or more predefined queries, and to display television programs corresponding to the program identifiers on the list, wherein the navigation controller comprises a single key activated to display multiple programs in the navigational axis successively with corresponding successive single activations of the single key without displaying the list of program identifiers.

25. The television navigation engine as recited in claim 24, wherein the navigation controller is on a remote controller and comprises a next key, a previous key and a select key, wherein the next key or previous key is used to cycle through the television programs corresponding to the list without having to access a menu listing the television programs in the list for navigating to display of a next television program in the list.

26. A multi-axis television program system that comprises:
a processor coupled to computer readable storage media;

a multi-axis database schema implemented by the processor executing instructions stored in the computer readable storage media, the schema comprising:
  instructions for arranging a database of television programming metadata into indices facilitating predefined queries, wherein:
    one or more links contextually associated with one or more attributes of a currently displayed television program call the predefined queries;
    the one or more attributes are selected by a viewer from among a set of attributes and logically combined using Boolean operators;
    each attribute of the set corresponds to a combinable navigation context which can be used for generating a navigable sequence of television programs along a navigational axis;
    the set of attributes corresponding to the currently displayed television program are automatically determined by the processor and displayed as viewer-selectable attributes when a user interface is activated during display of the currently displayed television program;
    the predefined queries return a list of identifiers from the database corresponding with one or more of the attributes;
    each list forms a navigational axis;
    each identifier in a list corresponds to either an on-demand or currently broadcast television program;
    the television programs on the list are displayed as accessed by a television channel navigation control for navigating one or more navigational axes, wherein the television channel navigation control comprises a next key, a previous key and a select key; and
    the next key or previous key is used to cycle through the television programs corresponding to the list without having to access a menu listing the television programs in the list for navigating to a next television program in the sequence.

27. The multi-axis television program system as recited in claim 26, wherein the one or more attributes include at least one of: type of program, program title, alphabetical order of title, year of release, channel, time, first air date, episode order, episode name, genre, actors, writer, director, producer, rating, sound characteristics, video characteristics, language, subtitles, closeness of match to search criteria, or popularity.

28. One or more storage media, wherein the storage media is not a signal, having instructions stored thereon that are executable by a computer to perform actions comprising:
  activating a navigation system during display of a currently displayed television program to display a set of viewer-selectable attributes related to the currently displayed television program;
  receiving a viewer selection of one or more attributes from among the displayed set of viewer-selectable attributes;
  launching a database query based on the one or more selected attributes corresponding to the currently displayed television program, wherein the query returns a list of program identifiers of television programs having the one or more attributes the list of program identifiers defining a navigational axis; and
  displaying sequentially the television programs corresponding to the program identifiers in the list when a user uses a navigation controller for changing television channels to navigate along the navigational axis without navigating a display of the list for navigating to a next television program in the list.

29. A method comprising:
  displaying a currently displayed television program on a television;
  activating a navigation system during display of the currently displayed television program, wherein the navigation system determines and displays a set of viewer-selectable attributes corresponding to the currently displayed television program;
  receiving selection of an attribute from the set of view selectable attributes;
  querying a database of television program metadata corresponding to television programs based on the selected attribute;
  receiving results from the querying wherein:
    the results comprise television program identifiers, and
    each of the television program identifiers identifies a television program having the selected attribute in common with the currently displayed television program;
  generating a navigational axis for navigating the television programs that correspond to the television program identifiers;
  receiving an instruction to change a channel on the television by activation of a single channel change key; and
  responsive to receipt of the instruction, navigating the navigational axis from a first channel displaying the currently displayed television program to a second channel displaying a different television program included in the navigational axis, wherein a listing of programs in the navigational axis is not displayed to effect the navigating the navigational axis.

30. The method of claim 29 further comprising presenting on the television at least some information for the television programs that correspond to the television program identifiers.

31. The method of claim 29 further comprising, during display of the different television program, activating the navigation system again, wherein:
  displaying a different set of viewer-selectable attributes that are descriptive of the different television program, and
  receiving a selection of one or more of the different attributes to create a new list of television program identifiers corresponding to the selected one or more different attributes for creating an additional navigational axis, the additional navigational axis based on results from a different query based on the one or more different attributes.

32. The method of claim 29 wherein a two-dimensional control feature allows for navigation along the navigational axis, the two-dimensional control feature comprising a next key and a previous key each being a channel change key, wherein the next key or previous key is used to cycle through the television programs in the navigational axis without having to access a menu listing the television programs in the navigational axis for navigating to a next television program in the navigational axis.

33. One or more storage media, wherein the storage media is not a signal, having computer-executable instructions stored thereon to perform the method of claim 29.

34. The method of claim 29, wherein the set of viewer-selectable attributes includes whether programs included in the navigational access are high definition programs.

* * * * *